US 7,516,090 B2

(12) United States Patent
Agarwal

(10) Patent No.: US 7,516,090 B2
(45) Date of Patent: Apr. 7, 2009

(54) DYNAMIC ATTRIBUTES

(75) Inventor: Sumit Agarwal, Redwood City, CA (US)

(73) Assignee: SAP AG, Walldorf (DE)

( * ) Notice: Subject to any disclaimer, the term of this patent is extended or adjusted under 35 U.S.C. 154(b) by 997 days.

(21) Appl. No.: 10/623,116

(22) Filed: Jul. 19, 2003

(65) Prior Publication Data

US 2005/0015305 A1   Jan. 20, 2005

(51) Int. Cl.
*G06F 17/60* (2006.01)
(52) U.S. Cl. .......................................... 705/26; 705/27
(58) Field of Classification Search .................... 705/26, 705/27
See application file for complete search history.

(56) References Cited

U.S. PATENT DOCUMENTS

| | | | | | |
|---|---|---|---|---|---|
| 5,765,138 | A * | 6/1998 | Aycock et al. | .................. | 705/7 |
| 5,802,493 | A * | 9/1998 | Sheflott et al. | .................. | 705/1 |
| 6,505,145 | B1 * | 1/2003 | Bjornson | ..................... | 702/185 |
| 6,526,423 | B2 * | 2/2003 | Zawadzki et al. | ............ | 715/235 |
| 6,728,660 | B2 * | 4/2004 | Bjornson | ..................... | 702/185 |
| 6,952,219 | B2 * | 10/2005 | Lee | ............................. | 345/593 |
| 7,072,061 | B2 * | 7/2006 | Blair et al. | ................. | 358/1.15 |
| 7,107,268 | B1 * | 9/2006 | Zawadzki et al. | ............. | 707/9 |
| 2001/0032163 | A1* | 10/2001 | Fertik et al. | .................... | 705/37 |
| 2002/0010685 | A1* | 1/2002 | Ashby | ........................ | 705/80 |
| 2002/0038285 | A1* | 3/2002 | Golden et al. | ................. | 705/38 |
| 2002/0073114 | A1* | 6/2002 | Nicastro et al. | ............. | 707/500 |
| 2002/0099578 | A1* | 7/2002 | Eicher et al. | .................... | 705/7 |
| 2002/0099579 | A1* | 7/2002 | Stowell et al. | ................. | 705/7 |
| 2002/0099580 | A1* | 7/2002 | Eicher et al. | .................... | 705/7 |
| 2002/0099598 | A1* | 7/2002 | Eicher et al. | ................... | 705/11 |
| 2002/0099612 | A1* | 7/2002 | Seaman et al. | ................ | 705/26 |
| 2002/0112114 | A1* | 8/2002 | Blair et al. | .................... | 711/100 |
| 2002/0116281 | A1* | 8/2002 | Costello et al. | ............... | 705/26 |
| 2002/0138289 | A1* | 9/2002 | Thielges et al. | ................ | 705/1 |
| 2002/0171662 | A1* | 11/2002 | Lee | ............................ | 345/593 |
| 2002/0188554 | A1* | 12/2002 | Holbrook | ..................... | 705/37 |
| 2002/0198818 | A1* | 12/2002 | Scott et al. | ..................... | 705/37 |
| 2003/0004656 | A1* | 1/2003 | Bjornson | ..................... | 702/34 |
| 2003/0014326 | A1* | 1/2003 | Ben-Meir et al. | ............. | 705/26 |
| 2003/0028469 | A1* | 2/2003 | Bergman et al. | .............. | 705/37 |
| 2003/0036991 | A1* | 2/2003 | Fortes et al. | ................... | 705/37 |
| 2003/0115099 | A1* | 6/2003 | Burns et al. | .................... | 705/14 |
| 2003/0172022 | A1* | 9/2003 | Coyne et al. | .................. | 705/37 |
| 2003/0191677 | A1* | 10/2003 | Akkiraju et al. | ................ | 705/8 |
| 2003/0195824 | A1* | 10/2003 | Duffy et al. | .................... | 705/26 |

(Continued)

OTHER PUBLICATIONS

BusinessWire1, "With Relevant's INFIMACS II ERP, users automatically generate vendor RFQ's from requisitions/estimates", Aug. 16, 2001.*

(Continued)

*Primary Examiner*—Mark Fadok
(74) *Attorney, Agent, or Firm*—Fish & Richardson P.C.

(57) ABSTRACT

Systems and techniques associate one or more dynamic attributes with one or more opportunities representing potential commercial transactions. Each opportunity may include one or more static attributes that are automatically associated with the opportunity. Each opportunity may further include one or more dynamic attributes. Subsequent to their creation, dynamic attributes may automatically be associated with each opportunity, with each opportunity of a particular type, with one or more opportunities meeting a certain criterion, or may be generated by a user for a particular instance of an opportunity.

48 Claims, 17 Drawing Sheets

U.S. PATENT DOCUMENTS

| | | | |
|---|---|---|---|
| 2003/0208434 A1* | 11/2003 | Posner | 705/37 |
| 2003/0212610 A1* | 11/2003 | Duffy et al. | 705/26 |
| 2003/0229522 A1* | 12/2003 | Thompson et al. | 705/4 |
| 2004/0019572 A1* | 1/2004 | Metz et al. | 705/80 |
| 2004/0039735 A1* | 2/2004 | Ross et al. | 707/3 |
| 2004/0044591 A1* | 3/2004 | Gilliland et al. | 705/27 |
| 2004/0054649 A1* | 3/2004 | Mehregany | 707/1 |
| 2004/0083156 A1* | 4/2004 | Schulze | 705/37 |
| 2004/0117294 A1* | 6/2004 | Ferraro et al. | 705/37 |
| 2004/0153310 A1* | 8/2004 | Beck | 704/10 |
| 2004/0187091 A1* | 9/2004 | Parasnis et al. | 717/104 |
| 2004/0215467 A1* | 10/2004 | Coffman et al. | 705/1 |
| 2005/0015305 A1* | 1/2005 | Agarwal | 705/26 |
| 2005/0055299 A1* | 3/2005 | Chambers et al. | 705/36 |
| 2006/0149653 A1* | 7/2006 | Davis et al. | 705/37 |
| 2008/0065515 A1* | 3/2008 | Bowler | 705/28 |

OTHER PUBLICATIONS

PR Newswire1, "econnections quote manager, "Quotility", gains broad electronics industry aceptance", Nov. 5, 2001.*

BusinessWire2, "BuildPoint announces transactional catalog for direct purchaser of construction materials online", Nov. 7, 2000.*

PR Newswire2, "MetalSite launches Quotefinder; The most advanced RFQ on the Internet", Sep. 5, 2000.*

Sumit Agarwal, "Dynamic Attributes" SAP AG 2002, Analysis of an Alternative Solution, PM Palo Alto 2.

* cited by examiner

212 — Create RFQ
214 — Create Auction

Opportunities
  Incomplete
  Open
  Published
  Active
  Closed
  Finalized
  Withdrawn

210

| Name | Type | Status | Workflow Status | Time Remaining | Bids |
|---|---|---|---|---|---|
| 230 — Cooling System | RFQ | Open | | | |
| Wheels | RFQ | Active | | | |
| Tubes | Auction | Published | | | |
| Cooling System | RFQ | Closed | | Closed | 6 |
| Tires | RFQ | Active | | | |

Create RFQ
Create Auction

Opportunities
  Incomplete
  Open
  Published
  Active
  Closed
  Finalized
  Withdrawn

Create New Line Item

Name: Breather Hose — 410

Quantity: 100 — 415 / 420

Base Unit: Pieces — 425

Category: Radiator

Ship By: 9/30/03  5:00 PM  PST — 430

Terms and Conditions — 435

Description — 440

Dynamic Attributes — 445

Attachment — 450

RFQ/RFI Invitation List

1. Set up invitation

Distribution List:
- ☒ Distribution List 1
- ☐ Distribution List 2
- ☒ Distribution List 3

Users:
- ☐ ABC Corp.
- ☐ ACME Industries
- ☒ Advantage Associates

2. Would you like to choose service partners?

☐ Yes, I would like to set up service partners

FIG. 5

You are invited to bid on the following

| Opportunity Name | Company | Type | Lot type | Time remaining | Bids | Actions |
|---|---|---|---|---|---|---|
| Cooling System | | | | | | |
| ACME Contract | | | | | | |
| AB 92805 System | | | | | | |

1. Opportunity Information

Classification  Manufacturing Components -> Rubber parts
Terms and Conditions  Payment to be made after user trials
Requester  ACME Products, Inc.,
Currency  EUR
Binding Date  December 19, 2003

2. Line Items

| Item | Quantity | Unit | Bid Amount (Total) |
|---|---|---|---|
| Breather Hose | 100 | Each | 500 |
| Air Filter Hose | 100 | Each | 800 |

Delivery Date  December 21, 2003

Submit

FIG. 7

DYNAMIC ATTRIBUTES

BACKGROUND

The present application describes systems and techniques relating to data processing for commercial transactions.

Dynamic electronic commerce (e-commerce) systems, such as online auction sites, allow for efficient buying and selling of goods and services. The systems are efficient both because they are able to reach a wide variety of geographically diverse participants, and because they allow the characteristics of the transactions to change over time (e.g., the bid amount changes to reflect the price a participant is willing to pay). In contrast, a static e-commerce system (such as a web site advertising products for sale at particular prices) may be less efficient, since purchasers are faced with a "take it or leave it" proposition.

Dynamic e-commerce systems may be particularly beneficial for purchasing agents who routinely enter into contracts for goods and services. For example, a particular company may produce a product for the consumer market that is manufactured using a number of different component parts. The company's purchasing department needs to purchase the component parts from reliable suppliers at the best prices. Dynamic e-commerce systems may allow the company to obtain bids from a number of suppliers, and to choose the best supplier based on the bids and/or other parameters. The systems may also simplify record-keeping, since the commercial transaction data is exchanged electronically.

One type of dynamic system allows users (such as purchasing agents) to create data objects including data related to one or more desired commercial transactions. The data objects may be referred to as "opportunities," and the associated data may be referred to as opportunity data. A purchasing agent may create the opportunity by accessing the system and entering opportunity data via a user interface generated by the dynamic system. For example, if a purchasing agent wished to enter into a transaction to obtain 1,000 stepper motors, the purchasing agent could access the dynamic system and create an "opportunity" including data related to the desired purchase.

A standard set of attributes may be associated with each opportunity created using the dynamic system. These standard or "static" attributes may include an opportunity name, an opportunity start date, an opportunity classification, a bid amount and the like. Data corresponding to each attribute (e.g., a bid amount of $100 corresponding to the static attribute "bid amount") may be provided to the dynamic system by a user interacting with the dynamic system via a user interface or may be generated automatically by the system.

For additional flexibility, a dynamic system may allow users or systems administrators (persons with the ability to modify the characteristics of the dynamic system itself) with the capability of creating or selecting a non-standard attribute to be associated with some opportunities. Non-standard attributes that may be associated with an opportunity are referred to as "dynamic attributes." Dynamic attributes may include, for example, a shipping method, a requested packaging material, a data sheet for a requested product, and the like. Note that the designation as a static attribute or a dynamic attribute is generally specific to the implementation of the dynamic system: that is, in one implementation an attribute such as a packaging material may be included in all opportunities (i.e., a static attribute), while in another it may be associated only with some opportunities by a user or system administrator (i.e., a dynamic attribute).

A dynamic system may allow a supplier to view opportunity data and to respond to the opportunity. For example, opportunity data may be emailed to potential suppliers, may be published on a public portal, or may be accessed by a supplier via one or more user interfaces presented to a supplier accessing the dynamic system. To respond to the opportunity (i.e., to submit response data corresponding to opportunity attributes such as a bid amount), the user may enter the response data via one or more user interfaces generated by the dynamic system as part of a response template for the opportunity.

The response template may include fields corresponding only to static attributes of the opportunity (e.g., a bid amount for a requested item), or may include dynamic attributes of the opportunity as well (e.g., a requested data sheet for a particular item).

SUMMARY

Systems and techniques described herein may provide for more efficient electronic commerce through the use of dynamic attributes.

In one aspect, a method includes receiving dynamic attribute parameters defining a administrator dynamic attribute. The dynamic attribute parameters may include including a name and a data type for the administrator dynamic attribute. The method may further include receiving a criterion to automatically determine whether to associate the administrator dynamic attribute with a particular opportunity representing a potential commercial transaction. The method may further include subsequently receiving user input to generate a new opportunity, the user input including attribute data for one or more attributes of the new opportunity, and determining whether the new opportunity meets the criterion based on the attribute data. The method may further include automatically associating the administrator dynamic attribute with the new opportunity if the new opportunity meets the criterion.

The attribute may be, for example, an opportunity type, and determining whether the new opportunity meets the criterion may include comparing opportunity type data for the new opportunity to particular opportunity types. In another example, the attribute may be a product name and/or a product quantity for a line item of the opportunity.

The method may further include generating a response template for an opportunity associated with the administrator dynamic attribute, where the response template includes one or more response user interfaces displaying attribute information pertaining to the administrator dynamic attribute and an administrator attribute field to receive user input comprising associated administrator dynamic attribute data.

The method may further include receiving user input to generate a different opportunity prior to receiving the criterion to automatically determine whether to associate the global dynamic attribute with a particular opportunity, wherein the user input includes dynamic attribute data for a dynamic attribute to associate with the different opportunity.

The method may further include receiving user input to generate a different opportunity prior to receiving the criterion to automatically determine whether to associate the global dynamic attribute with a particular opportunity, wherein the user input includes dynamic attribute data for a dynamic attribute to associate with the different opportunity.

The method may include receiving user input to generate a new opportunity based on a copied opportunity. The method may further include associating a different set of dynamic attributes with the new opportunity than with the copied opportunity.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 2 is a diagram of a user interface for a dynamic bidding tool.

FIGS. 3A and 3B are diagrams of a user interface for creating an opportunity.

FIG. 4 are diagrams of a user interface for creating a line item for an opportunity.

FIG. 5 shows an embodiment of a user interface for setting up an invitation list.

FIG. 6 are diagrams of a user interface for a potential supplier.

FIG. 7 are diagrams of a user interface for submitting a bid on an opportunity.

Like reference symbols in the various drawings indicate like elements.

DETAILED DESCRIPTION

In order to provide more efficient data processing for commercial transactions, systems and techniques described herein allow for automatic association of dynamic attributes with opportunities in a dynamic e-commerce system. Additionally, the predictability of the current systems and techniques is improved by providing a method for fixing the contents of a response template associated with an opportunity. Finally, the current systems and techniques may be used to create a new opportunity including appropriate dynamic attributes by copying an existing opportunity, even when the structure of the existing opportunity is different than the new opportunity (e.g., the new opportunity has an opportunity type different than the existing opportunity).

The systems and techniques are described with reference to a dynamic bidding tool, referring to a software-implemented e-commerce system. The dynamic bidding tool allows potential parties to commercial transactions to interact via electronic systems such as computer networks. The dynamic bidding tool may be implemented in a number of ways. It may be implemented so that potential participants are registered with the system before they can participate in commercial activities using the system. Alternately, it may be implemented so that some participants are registered with the system, while others may access and participate in commercial activities through a public venue, such as a public portal.

In an implementation, the dynamic system is a web-based dynamic bidding tool that provides parties with the ability to submit requests for information (RFIs), requests for quotation (RFQs), and to run auctions such as reverse auctions. The dynamic bidding tool may be implemented in a computer system including one or more computers that may be connected via a computer network. One type of user of the dynamic bidding tool is a purchasing agent who needs to purchase one or more products or services, while another type of user of the dynamic bidding tool is a supplier of one or more products/services.

The users described above may create opportunities and responses in order to enter into commercial transactions. In contrast, a system administrator of the dynamic bidding tool may make global changes to the characteristics of the dynamic bidding tool. For example, the system administrator may alter the characteristics of the user interfaces presented to users creating an opportunity.

Figure 1A:
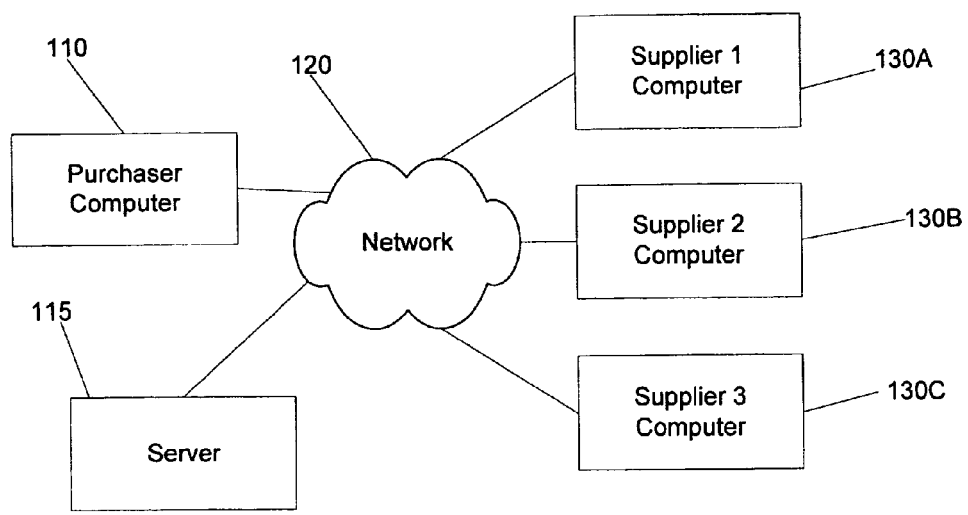
FIGS. 1A and 1B are block diagrams of systems for implementing a dynamic bidding tool.

In an implementation of a dynamic bidding tool, the tool is stored on one or more computer systems, and may be accessed by users through a computer network. For example, a purchasing agent may access the dynamic bidding tool on a local computer, or on a remote computer via a network. FIG. 1A shows an implementation where at least a portion of a dynamic bidding tool is stored on a purchaser computer 110, a server 115, and/or supplier computers 130A-130C. Purchaser computer 110 and/or supplier computers 130A-130C may access server 115 directly or via a network 120.

A user, such as a purchasing agent, uses the dynamic bidding tool to create opportunities. Opportunity data is then stored on, for example, server 115. Purchaser computer 100 is configured to communicate with supplier computers 130A, 130B, and 130C over network 120. Supplier computers 130A, 130B, and 130C may include at least a portion of the dynamic bidding tool. Note that although one purchaser computer 110 and three supplier computers 130A, 130B, and 130C are shown here, different numbers of each type of computer may be used. Further, a company that is a supplier of one particular product/service may be a purchaser of another product/service.

Figure 1B:
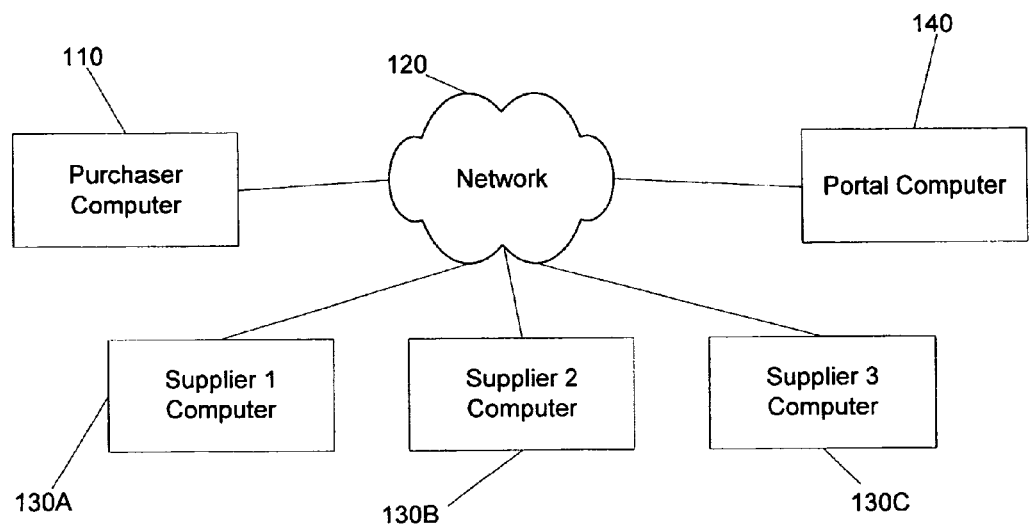

FIG. 1B shows an implementation in which purchaser computer 110 may interact with supplier computers 130A, 130B, and 130C via a portal computer 140 over a network 120. The network may include one or more local area networks (LANs), one or more metropolitan area networks (MANs), one or more wide area networks (WANs), one or more enterprise networks, one or more virtual private networks (VPNs), or another network such as the Internet.

In order to create an opportunity including static and dynamic attributes, a user may access the dynamic bidding tool by selecting an icon representing the dynamic bidding tool. A user interface for creating opportunities may then be displayed to the user. FIG. 2 shows an implementation of a user interface 200 for creating an opportunity including opportunity data associated with a desired commercial transaction. Interface 200 may include a first area 210 and a second area 220. First area 210 includes user-selectable navigation items such as a "create RFQ" item 212, and a "create auction" item 214. In response to user selection of a navigation item, the computer system provides a user interface related to that navigation item.

When a user initially accesses the dynamic bidding tool, second area 220 may show a summary of the opportunities that have been created by the user, including an opportunity 230. Opportunity 230 has an opportunity name equal to "Cooling System," an opportunity type equal to RFQ, and an opportunity status equal to "Open." Opportunity 230 may also include a workflow status column, a time remaining column, and a bids column. Other columns may be included to present opportunity-related information to the user.

Figure 3A:
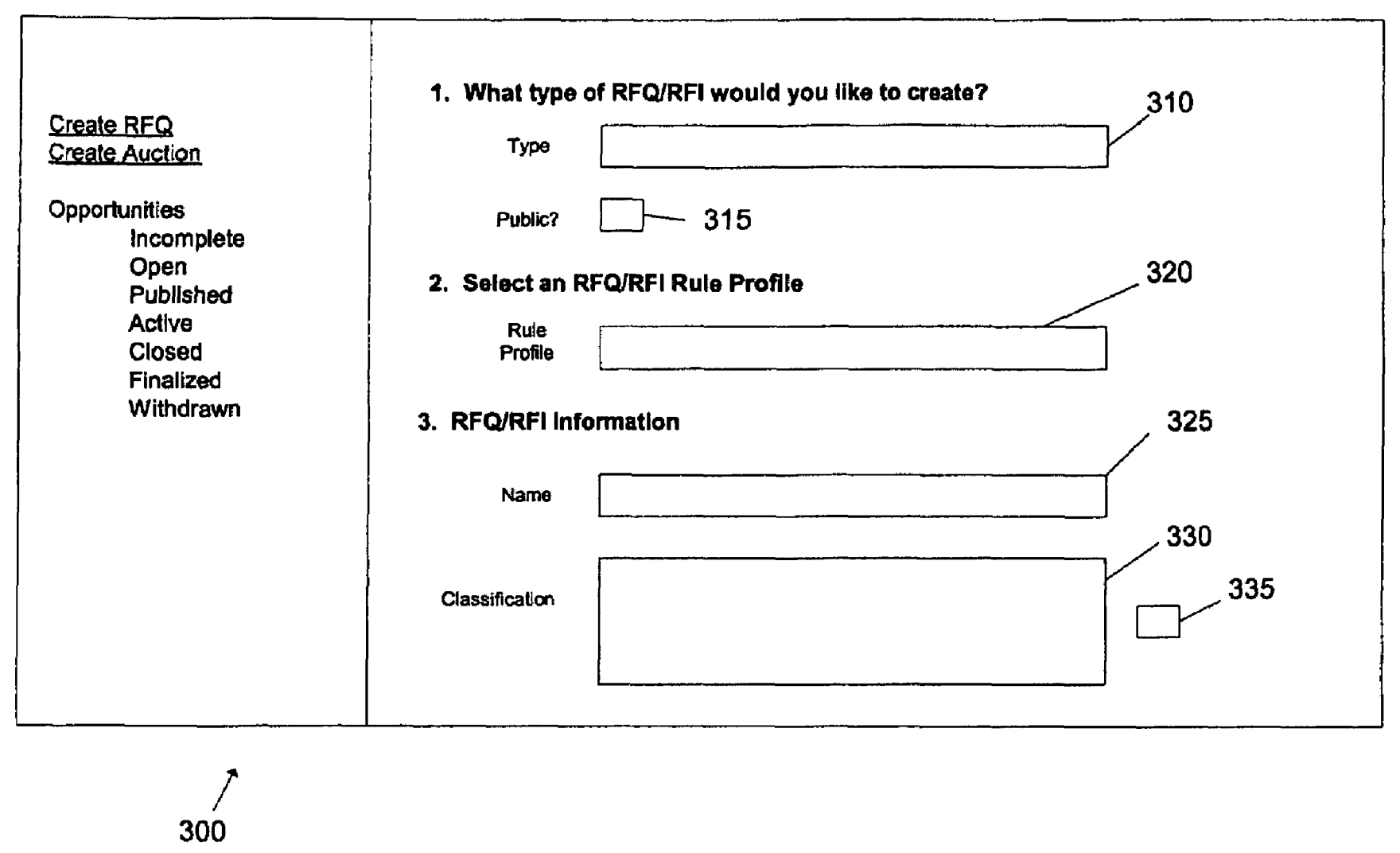
Figure 3B:
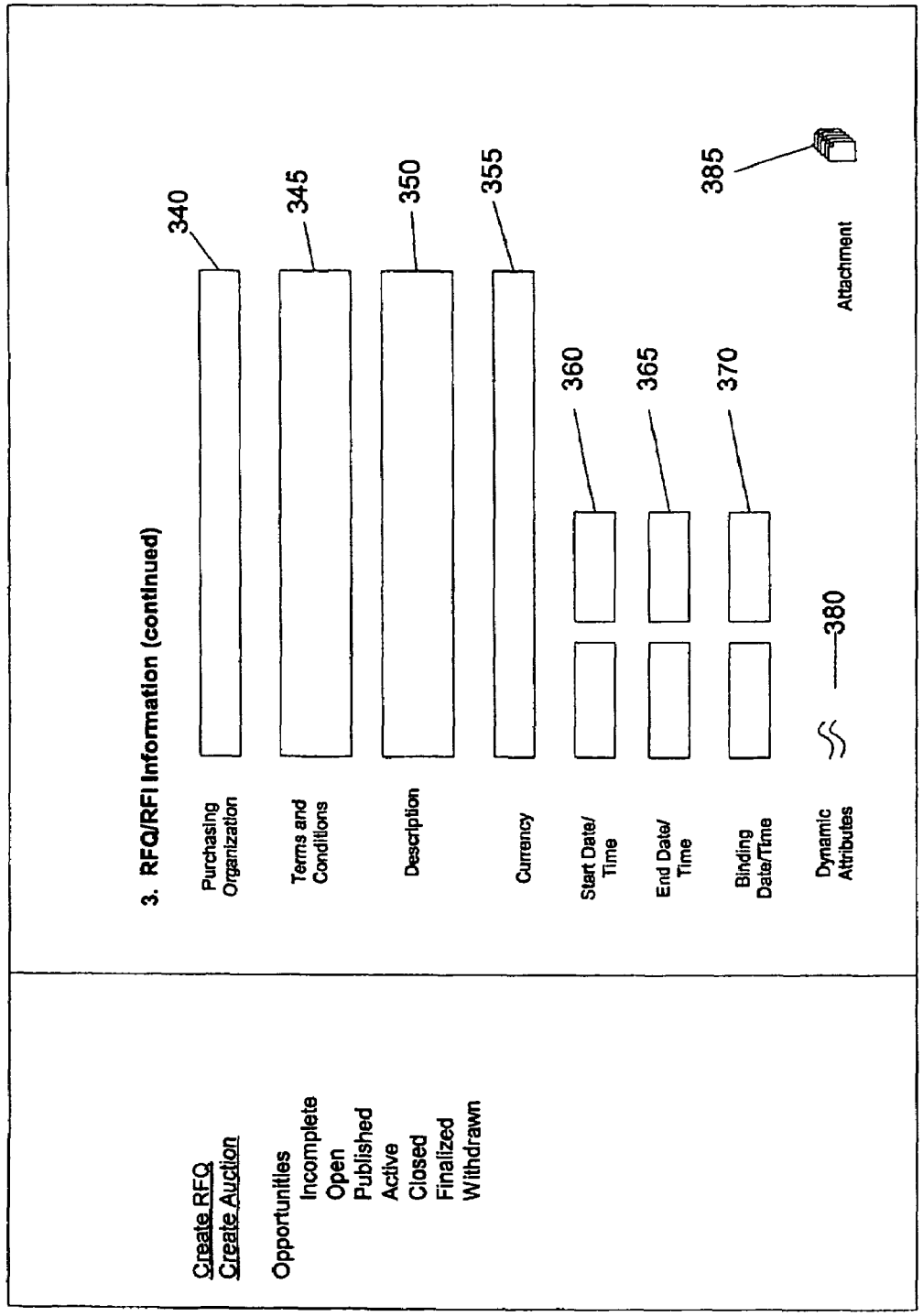

The user may choose to create an RFQ by selecting the "create an RFQ" item in first area 210. In response to selecting the "create an RFQ" item, additional user interfaces may be presented to the user for creating the RFQ (that is, for creating an opportunity with an opportunity type equal to RFQ). FIGS. 3A and 3B show an implementation of a user interface 300. A user may enter an RFQ/RFI type in an area 310, and may choose whether the RFQ will be a public opportunity by selecting/deselecting a checkbox 315. Note that in different implementations, different field types and data entry methods may be enabled. For example, some fields may allow data entry using text boxes, check boxes, and drop-down menu selections.

A user may choose an RFQ/RFI rule profile in area 320. The rule profile includes one or more rules that govern the operation of the opportunity. In some implementations, the user may select individual rules as well as or instead of selecting rule profiles. In some implementations, users can create rules and/or rule profiles to govern the operation of one or more opportunities.

Opportunity rules may govern whether a potential supplier may submit bids for less than the full desired quantity, and whether a potential supplier may submit bids for fewer than all of the line items in the opportunity. Rules may determine whether an RFQ has a starting price, whether the opportunity has a set closing date and time, whether sealed bidding is allowed, whether anonymous bidding is allowed, whether the opportunity closing date and time may be extended due to activity near the scheduled closing, and/or whether the responses will be ranked based on the price quoted.

In some implementations, opportunity rules may be used to automate the process of validating bids and bidders. In a particular situation, not all potential suppliers may be equal. For example, a purchaser may have an preferred supplier list, an approved supplier list, a secondary supplier list, may place suppliers in different groups, or may rate suppliers individually. Other rules may be implemented to implement other differences.

The user may name the opportunity in an area 325. Additionally, the user may provide a classification for the opportunity in an area 330. Alternately, the user may choose a classification from a list of classifications by choosing an icon 335. The user may choose or enter a purchasing organization in an area 340, and may choose or enter terms and conditions in an area 345.

The user may enter a description in an area 350, a currency in an area 355, a start date/time in an area 360, an end date/time in an area 365, and a binding date/time in an area 370. A user may create one or more dynamic attributes for the opportunity by selecting an icon 380. One or more attachments can be associated with the opportunity using an attachment icon 385. Note that the attachment feature is separate for convenience; associated attachments may be one type of dynamic attribute that may be associated with the opportunity. In other implementations, more, fewer, and/or different options may be provided to the user.

After general opportunity data is provided, the user may access another user interface to enter data associated with one or more line items for the opportunity, where the term "line item" refers to a particular product or service that is the subject of a desired commercial transaction. FIG. 4 shows a user interface 400 that may be used to create a new line item for an opportunity.

The user may enter a name for the desired product or service in an area 410, and a desired quantity in an area 415. The user may enter base unit data in an area 420, category data in an area 425, ship-by data in an area 430, terms and conditions data in an area 435, and a description in an area 435. The user may create one or more dynamic attributes by choosing an icon 445. One or more attachments can be associated with the line item using an attachment icon 450.

In order to facilitate commercial transactions, opportunity data, such as the general opportunity data and line item data described above, is communicated to one or more potential suppliers. In some implementation, the user may select particular suppliers to receive opportunity data in order to solicit bids from those particular suppliers. The dynamic bidding tool may include a user interface for selecting suppliers to receive opportunity data.

For example, FIG. 5 shows a user interface 500 for creating an invitation list for an opportunity. The term "invitation list" refers to a list of suppliers to receive the opportunity data. An invitation list may include suppliers selected individually, as well as suppliers listed on one or more distribution lists (a term used to refer generally to a list of recipients related by a particular characteristic). For example, different distribution lists could include preferred suppliers of machined parts, secondary suppliers of machined parts, suppliers of specialty machined parts, and suppliers of machined ceramic parts. There may be overlap among the distribution lists. For example, one supplier of specialty machined parts may also be a preferred or secondary supplier of machined parts. Of course, many other implementations are possible.

In order to add the members of one or more distribution lists to the opportunity invitation list, a user may select one or more pre-existing distribution lists using an area 510. In some implementations, a number of pre-existing distribution lists 520 are presented to the user, who may select one or more of the lists using an appropriate checkbox 530.

The user may select one or more users using an area 540. In some implementations, a number of pre-determined users 550 are presented to the user, who may select one or more using the appropriate check box 560. Users are generally individual recipients that may or may not be included in one or more distribution lists. For example, each of the machined parts suppliers on the distribution lists described above may be listed as available users. Providing the capability for choosing individual potential suppliers provides more flexibility for the purchaser.

The user may choose to set up service partners by selecting a checkbox 570. Generally, service partners include preferred and/or contracted providers for services such as logistics and insurance. Providing the capability to choose service partners may lower the cost of the services to the purchaser/supplier, since rates for the services can be negotiated prior to the particular commercial transaction reflected in the opportunity.

Once the general opportunity data, line item data, and invitation list data have been provided, the opportunity data may be saved. Opportunity data may then be provided to suppliers on the invitation list (and/or the general public, if the opportunity is public) so that they may respond.

An opportunity can be communicated to a prospective supplier via email, where the email includes a link to the opportunity. That is, the email may include a user-selectable item for accessing a response template including one or more user interfaces, where the user interfaces allow the supplier to view portions of the opportunity data (e.g., a list of the line items, the requested ship by dates, etc.), as well as to respond to the opportunity (e.g., by entering data such as a bid amount and bid quantity for one or more line items of the opportunity). Alternately, the prospective supplier may log on to a dynamic bidding tool and access response templates associated with opportunities to which he has received an invitation.

For example, a supplier may log into a dynamic bidding tool and view a user interface such as interface 600 of FIG. 6. Interface 600 includes a list 610 of opportunities to which the supplier has been invited to submit a bid. Interface 600 may display additional data about the opportunities, such as the company initiating the opportunity, the opportunity type, the lot type, the status, the time remaining, and the number of bids received. A supplier may bid on an opportunity by choosing a "create bid," selection from a drop-down menu in an action column 620.

In response to selecting "create bid" for a particular opportunity, one or more user interfaces for responding to the opportunity are presented to the user. For example, FIG. 7 shows a user interface 700 for creating a response to opportunity. A first area 710 includes details about the opportunity, such as the opportunity classification, terms and conditions, requester, currency, and binding date. Interface 700 includes a second area 720 with details about particular line items for the opportunity. For the example shown in FIG. 7, the opportunity rule profile was full/full (bids must be for the full quantity of each of the line items). Therefore, the supplier enters a total price in a box 730. The supplier chooses a delivery date in an area 740. The supplier selects a "submit bid" button 750 to submit the bid.

The opportunity data is generally communicated to a number of suppliers, in order to solicit multiple bids for the line items in the opportunity. An opportunity generally has a start date and time (the date and time after which potential suppliers may respond to the opportunity), and an end date and time (the time after which no more responses are accepted). Once the end date and time has passed, the opportunity is closed and a winner is determined.

Figure 8:
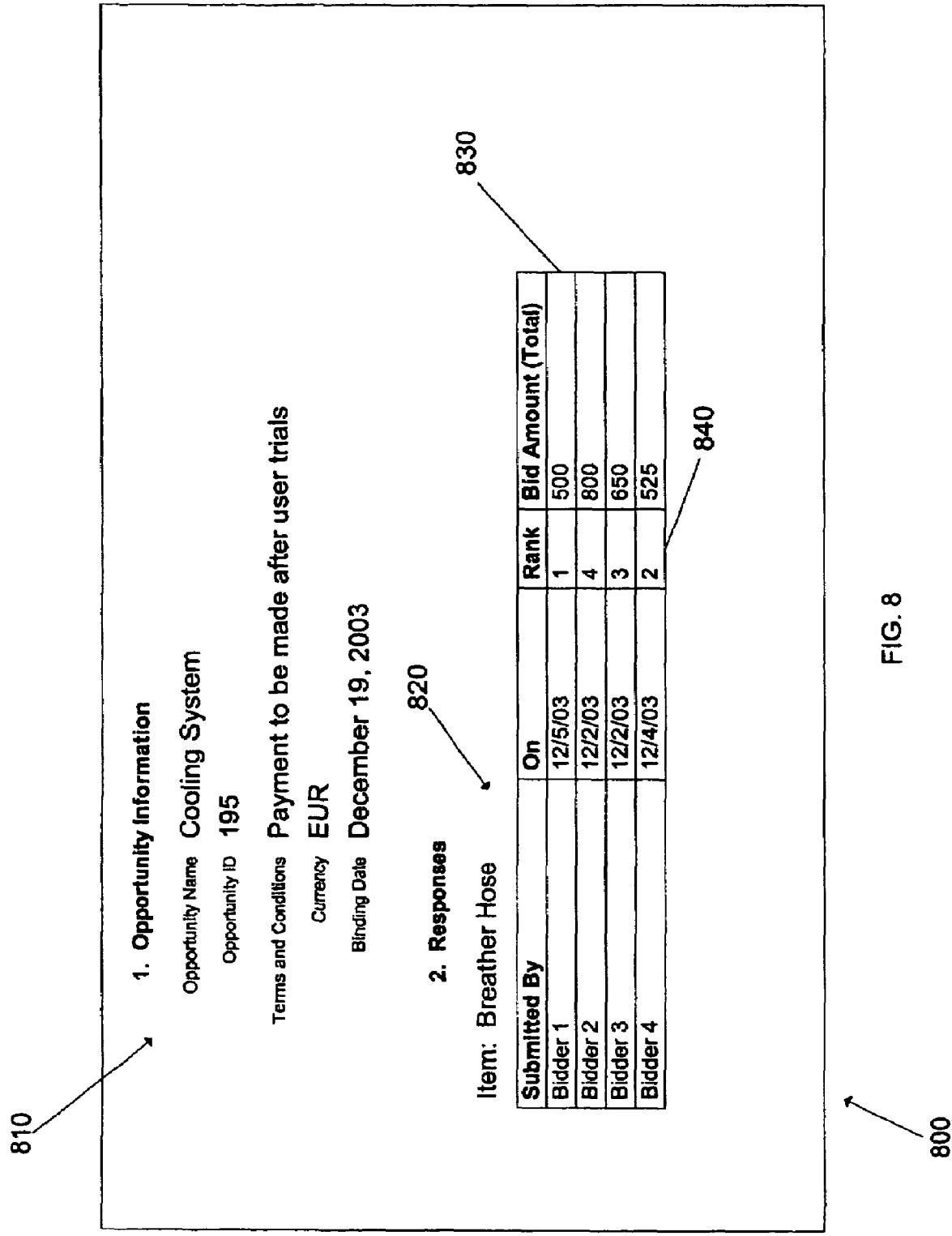
FIG. 8 are diagrams of a user interface for winner determination.

The opportunity initiator (e.g., the purchasing agent at the company that needs to purchase the particular product(s) and/or service(s)) or other user may determine the winner based on response data for the opportunity. A user interface such as interface 800 of FIG. 8 may be provided to the appropriate user for winner determination. Interface 800 includes a first area 810 with general information about the opportunity. Interface 800 includes a second area 820 including bid information for the opportunity. For example, second area 820 may include information pertaining to all bids submitted for the opportunity. The information may include a bid amount 830 for each bidder, as well as a ranking 840 for each bidder. Note that the ranking may be based on more than price. In some implementations, different response parameters may be given different weights, and the ranking may reflect this weighting. For example, if an item is particular difficult to obtain, a large quantity of the item may be assigned a substantial weight. In such a case, a bid offering (for example) 100 units at a unit price of $100 each may be ranked higher than a bid offering 70 units at a unit price of $80. Further, in some implementations, a user may select a winner based on bid information. In others, winner determination may be accomplished automatically.

Dynamic Attributes

A dynamic bidding tool such as that described above may allow automatic association of dynamic attributes with later-created opportunities to enable efficient creation and storage of opportunities. Such a system provides users with the flexibility of creating opportunities with relevant dynamic attributes (e.g., dynamic attributes that are relevant to a particular product to be purchased but not to other products) without requiring the user to associate the attribute with the opportunity each time the user creates an opportunity for which the attribute is relevant.

Figure 9:
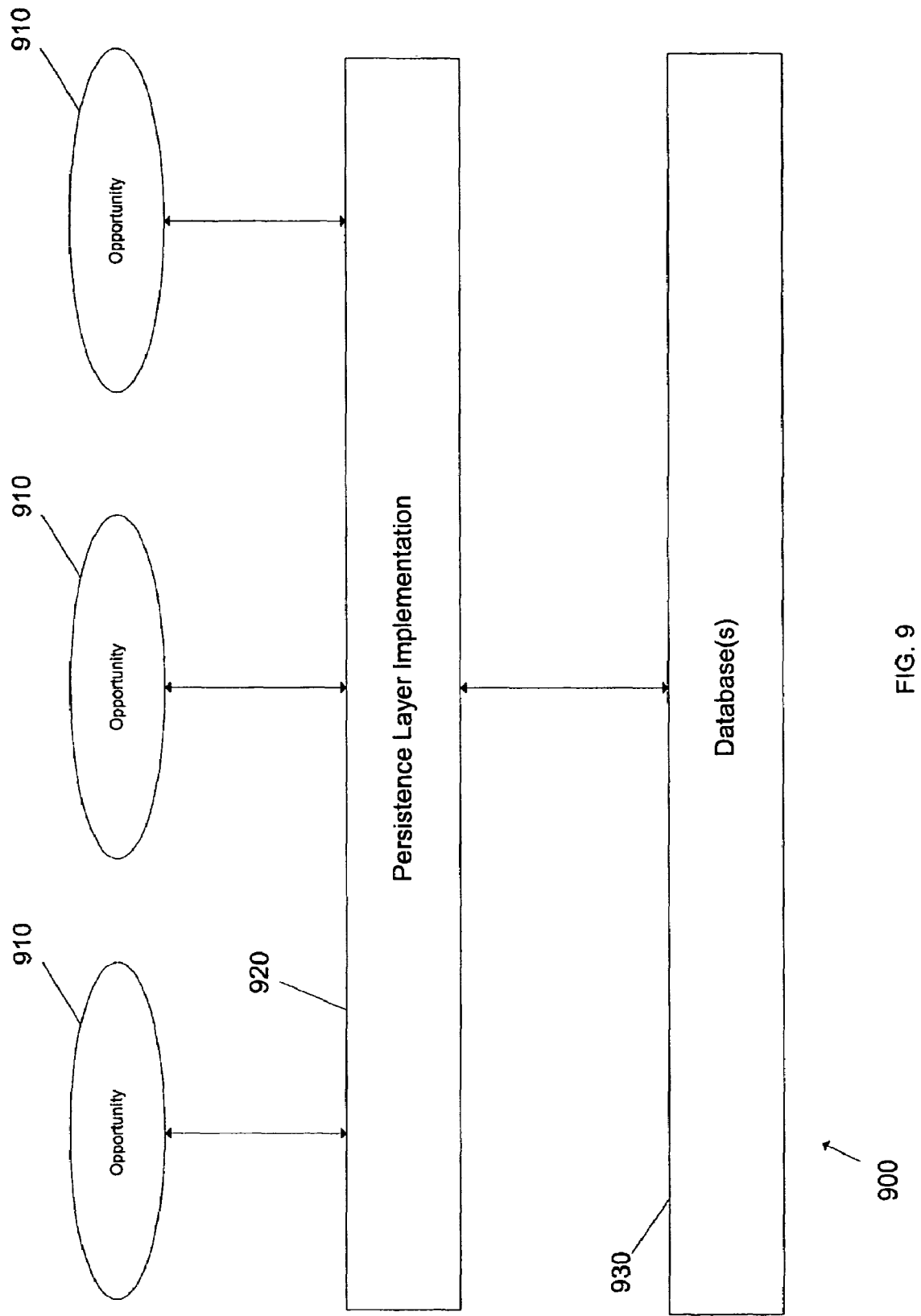
FIG. 9 is a conceptual diagram of a data structure for a dynamic bidding tool implementing dynamic attributes.

In order to provide this flexibility, the current systems and techniques provide for the creation of dynamic attributes by both users and system administrators. FIG. 9 shows a conceptual diagram of a data structure 900 for storing and accessing data for a plurality of data objects such as opportunities 910. Data associated with opportunities 910 may be stored in one or more databases 930 and may be accessed via a persistence layer implementation 920. Persistence layer 920 serves as an interface to databases 930. Persistence layer 920 provides standardized access to databases 930, so that differences among database specifics are abstracted.

A data structure 900 may allow efficient implementation of dynamic attributes in the following manner. Since static attributes are common among each opportunity created using the dynamic bidding tool, static attributes may persist as a column in database 930. Static attribute data associated with a particular opportunity 910 may be stored in a particular row of database 930.

Since dynamic attributes may be associated with some but not all opportunities, dynamic attribute data may be stored differently than static attribute data. For example, one or more database tables of database 930 may be a dynamic attribute table. Dynamic attributes may be created by specifying attribute parameters such as a name, data type, default value, whether the attribute is removable (e.g., whether a user creating an opportunity with which the particular dynamic attribute is automatically associated may remove the dynamic attribute from the opportunity), whether the attribute is mandatory (e.g., whether attribute data is required when creating or responding to an opportunity associated with the attribute), the status of the attribute (e.g., whether it is active, inactive, or archived), and a position of the dynamic attribute.

Figure 10A:
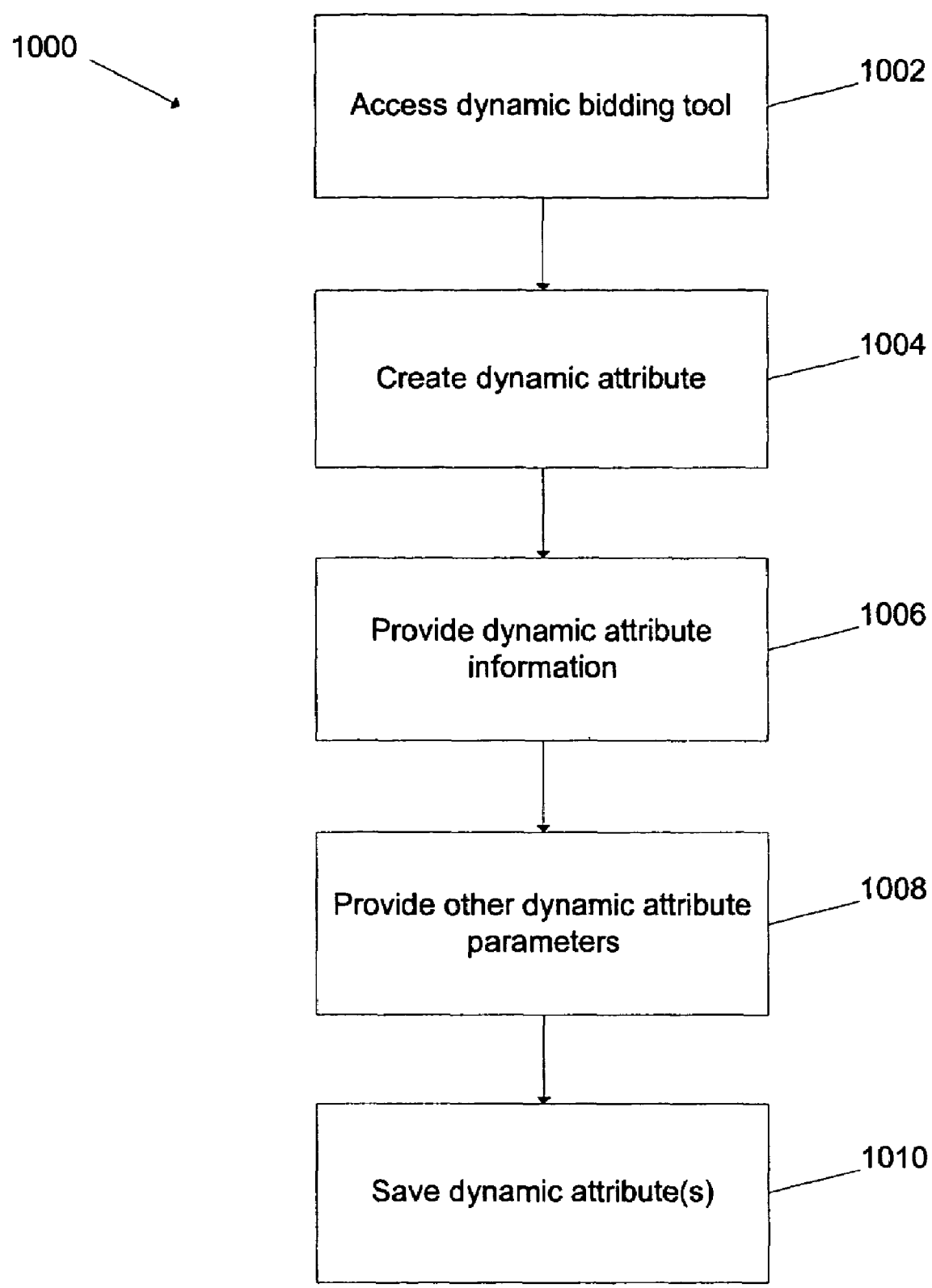
FIGS. 10A-10D are flow charts illustrating methods of associating dynamic attributes with opportunities.

FIGS. 10A-10D show methods of creating dynamic attributes to be associated with subsequently created opportunities. FIG. 10A shows a method 1000 in which a system administrator may create one or more administrator dynamic attributes to be associated with each opportunity created using the dynamic bidding tool.

In order to create administrator dynamic attributes, a system administrator may access the dynamic bidding tool from an administrator console (1002), where the term administrator console refers to an interface to the dynamic bidding tool for modifying the dynamic bidding tool itself (rather than creating or modifying opportunities stored in the dynamic bidding tool). The system administrator may choose to create one or more dynamic attributes to be associated with each opportunity of a particular type, or with each opportunity, regardless of opportunity type (1004). For example, the system administrator may interact with a user interface to choose a field type, field name, default value, base unit, whether the attribute is removable or not, whether the attribute is mandatory or not, and/or other information for the dynamic attribute (1006). The system administrator may additionally choose other parameters related to the dynamic attribute, such as the appearance of dynamic attribute information on a user interface for a dynamic bidding tool user, the placement of dynamic attribute information on a user interface, or other parameters (1008). The system administrator may save the dynamic attribute to be associated with each data object (or type of data object) created (1010). In some implementations, the dynamic attribute is associated with each new business object created after the system administrator saves the dynamic attribute, while in others, business objects created prior to saving the dynamic attribute may be associated with the dynamic attribute.

In an example, a system administrator may create a dynamic attribute named "Requesting Department" to be associated with all subsequently created opportunities with an opportunity type equal to an RFQ, so that potential suppliers know which particular department generated the RFQ. After the system administrator creates and saves the dynamic attribute in the dynamic trading system, a user may subsequently choose to create an opportunity with an opportunity type equal to an RFQ. In response, the system generates a user interface such as that shown in FIGS. 3A and 3B for creating an RFQ. In addition to the items shown in FIGS. 3A and 3B, the user interface would also include an area for specifying the requesting department. Similarly, the opportunity data communicated to the supplier on the response template would include the Requesting Department information (for example, a user interface such as interface 700 would include an area with the Requesting Department information).

Figure 10B:
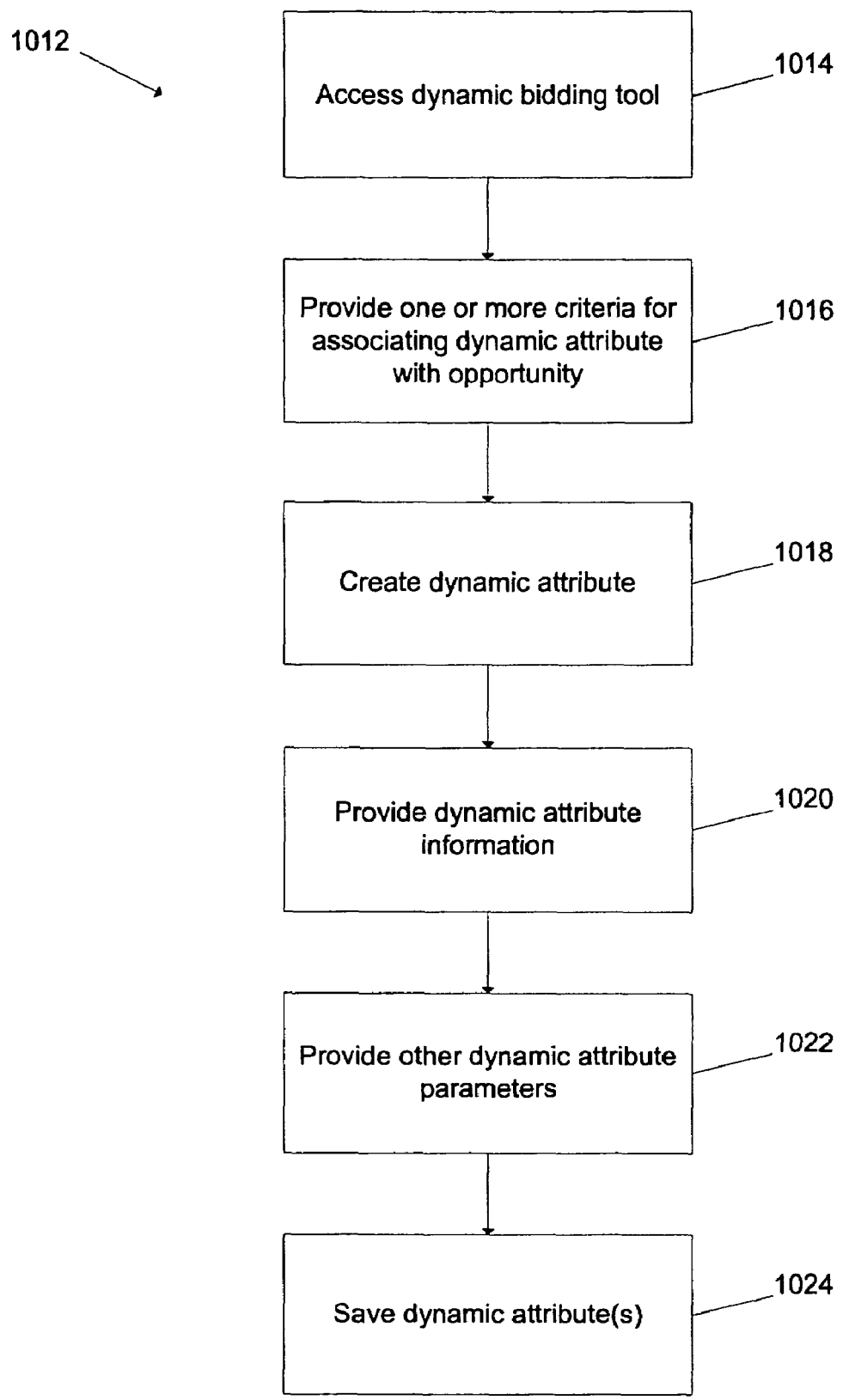

The method of FIG. 10A allows a system administrator to create dynamic attributes to be associated with all opportunities, or with opportunities of a particular type. For more efficient customization of opportunities, a dynamic bidding tool may allow a system administrator to choose criteria that define when a administrator dynamic attribute is associated with an opportunity created using the dynamic bidding tool. FIG. 10B shows a method 1012 that a system administrator may use to associate one or more administrator dynamic attributes with a business object such as an opportunity or a response. A system administrator may access the dynamic bidding tool from the administrator console (1014). The system administrator may provide one or more criteria for automatically associating a particular dynamic attribute with an opportunity (1016). The system administrator may then choose to create one or more dynamic attributes to be associated with each opportunity meeting the criteria (1018). The system administrator may interact with a user interface to choose a field type, field name, and other information for the dynamic attribute (1020). The system administrator may additionally choose other parameters related to the dynamic attribute, such as the appearance of the dynamic attribute to a dynamic bidding tool user, the placement of dynamic attribute information on a user interface, or other parameters (1022). The system administrator may save the dynamic attribute to be automatically associated with each opportunity meeting the criteria (1024). In some implementations, the dynamic attribute is associated with each new opportunity meeting the criteria that is created after the system administrator saves the dynamic attribute, which in others, opportunities meeting the criteria that were created prior to saving the dynamic attribute may be associated with the dynamic attribute.

Many different criteria may be used to determine whether a dynamic attribute is associated with an opportunity. For example, the system administrator may choose to create a dynamic attribute named "Setup Cost" to be associated with opportunities having one or more line items with a classification equal to "Machined Parts." A user may subsequently create an opportunity, including a "Machined Parts" line item. The system may compare the classification of each of the line items of the opportunity to classifications that correspond to criteria for associating dynamic attributes, and as a result may associate the "Setup Cost" attribute with the opportunity. Since this dynamic attribute corresponds to information to be submitted by potential suppliers, an appropriate item (e.g., a labeled text box for entering a setup cost) is included in a response template for the opportunity.

FIGS. 10A and 10B may used by a system administrator to create administrator dynamic attributes to be associated with multiple instances of opportunities automatically. A dynamic bidding tool implementing such methods may provide efficiency as well as customization. However, in some circumstances, it may be beneficial to allow users to associate dynamic attributes with opportunities on an individual basis.

Figure 10C:
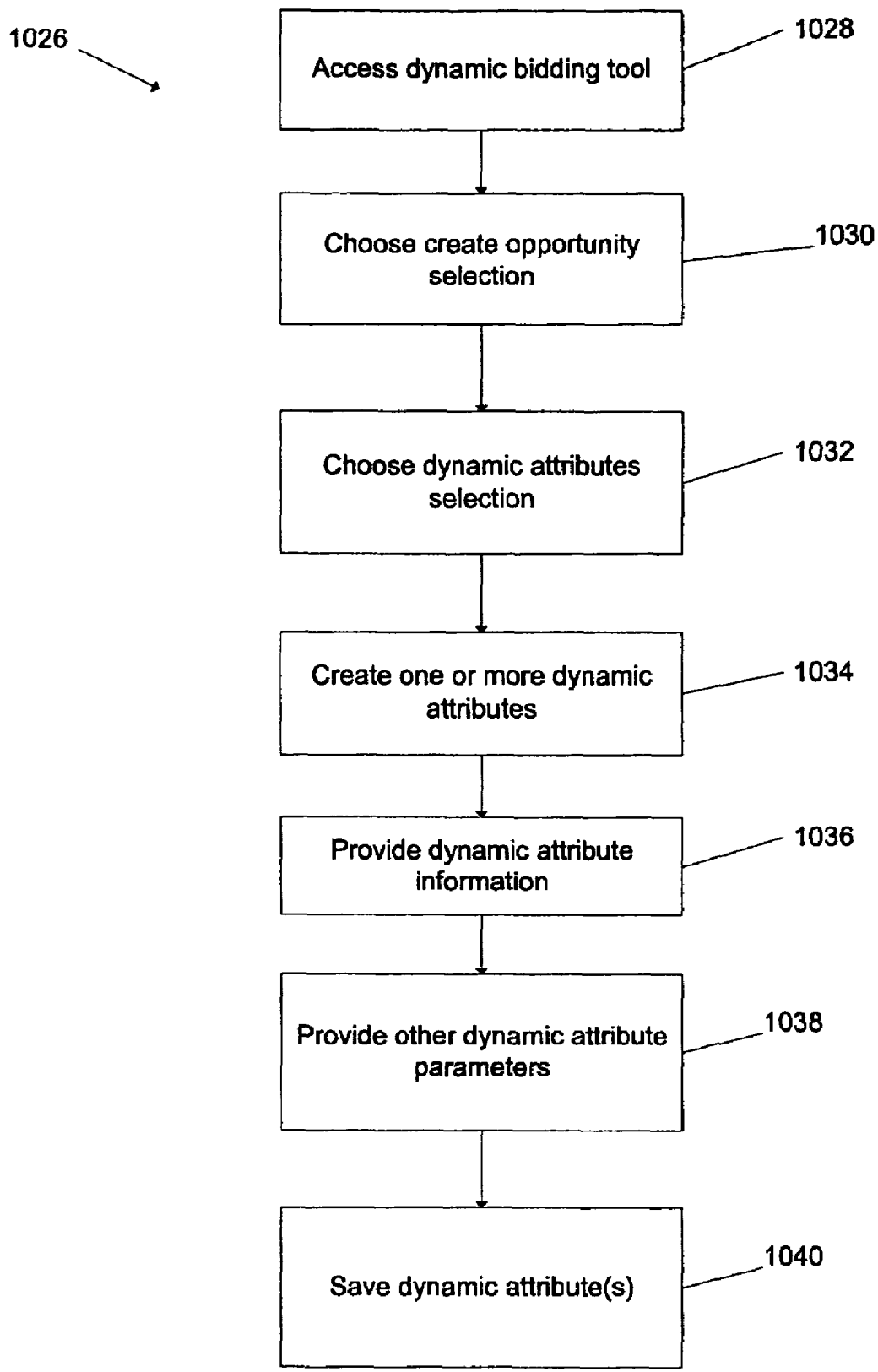
Figure 10D:
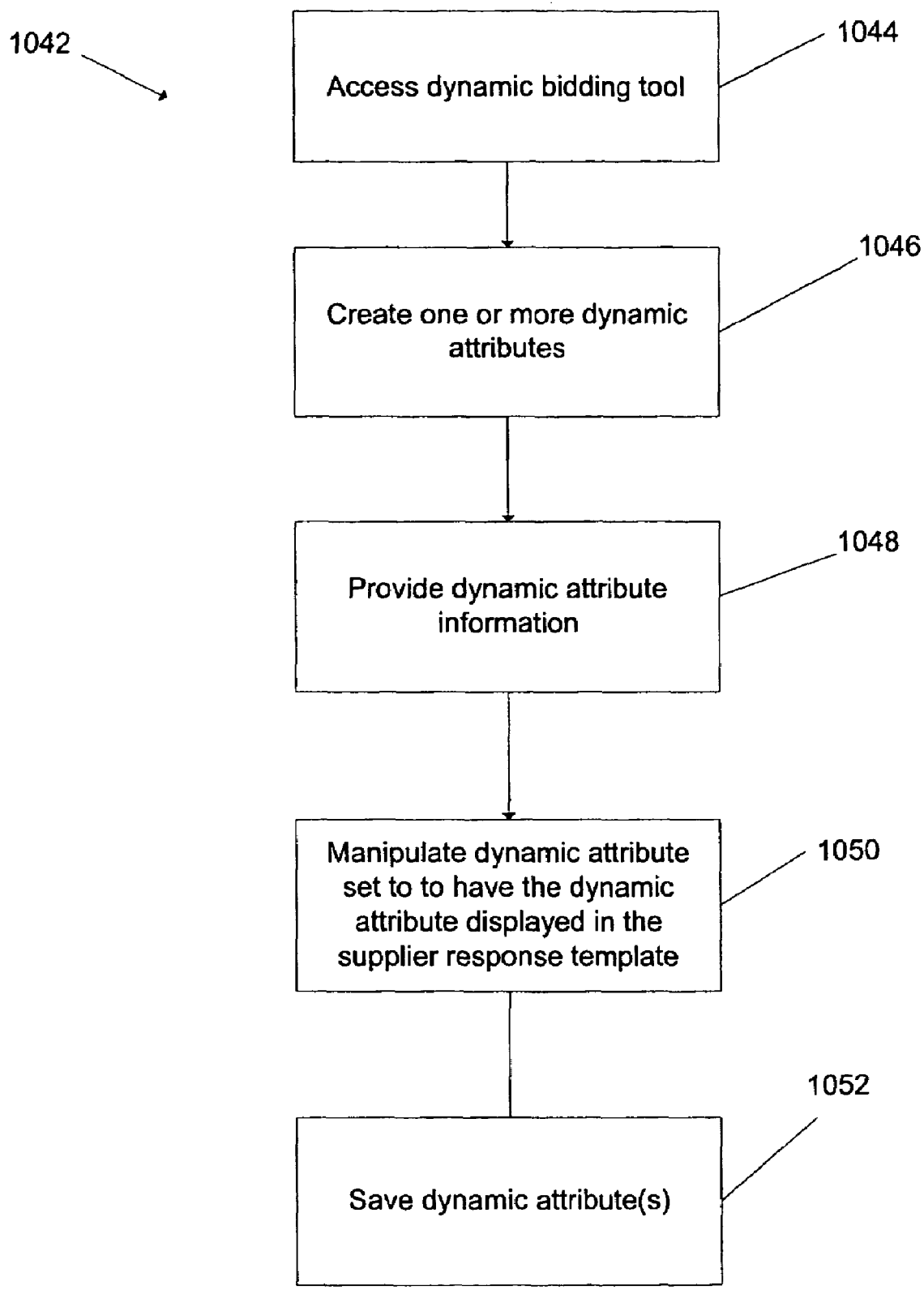

FIGS. 10C and 10D show methods that may be used for creation of a dynamic attribute for a particular opportunity in a dynamic bidding tool such as that described above with reference to FIGS. 2 through 8. FIG. 10C shows a method 1026 that a user may use to associate one or more dynamic attributes with an opportunity. The user may access the dynamic bidding tool (1028). The user may choose the "create opportunity" selection from an interface such as interface 200 of FIG. 2 (1030). The user may choose a "dynamic attributes" selection from a user interface such as interface 300 of FIG. 3B (1032). The user may then create one or more dynamic attributes to be associated with the opportunity (1034). The user may interact with a user interface to choose a field type, field name, and other information for the dynamic attribute (1036). The user may additionally choose other parameters related to the dynamic attribute, such as the appearance of the dynamic attribute to a dynamic bidding tool user, the placement dynamic attribute information on a user interface, or other parameters (1038). The user may save the dynamic attribute to be associated with the particular opportunity instance (1040).

FIG. 10D shows an method 1042 where a user creates an opportunity with a dynamic attribute that is included in a supplier response. As with FIG. 10C, the user may access the dynamic bidding tool (1044), may choose the "create opportunity" selection from an interface, and may choose a "dynamic attributes" selection. The user may then create one or more dynamic attributes to be associated with the opportunity (1046). The user may interact with a user interface to choose a field type, field name, and other information for the dynamic attribute (1048). The user may manipulate the dynamic attribute set to have the dynamic attribute displayed in the supplier response template (1050). A user may choose this option to solicit information from the supplier not generally obtained in a standard supplier response template. For example, the user may wish to obtain information as to a proposed shipping method for a particular RFQ. Other manipulations are possible; for example, the user may choose this option to provide default information to potential suppliers or to delete one or more attributes that are not needed for the particular opportunity. The user may save the dynamic attribute(s) (1052).

Figure 11:
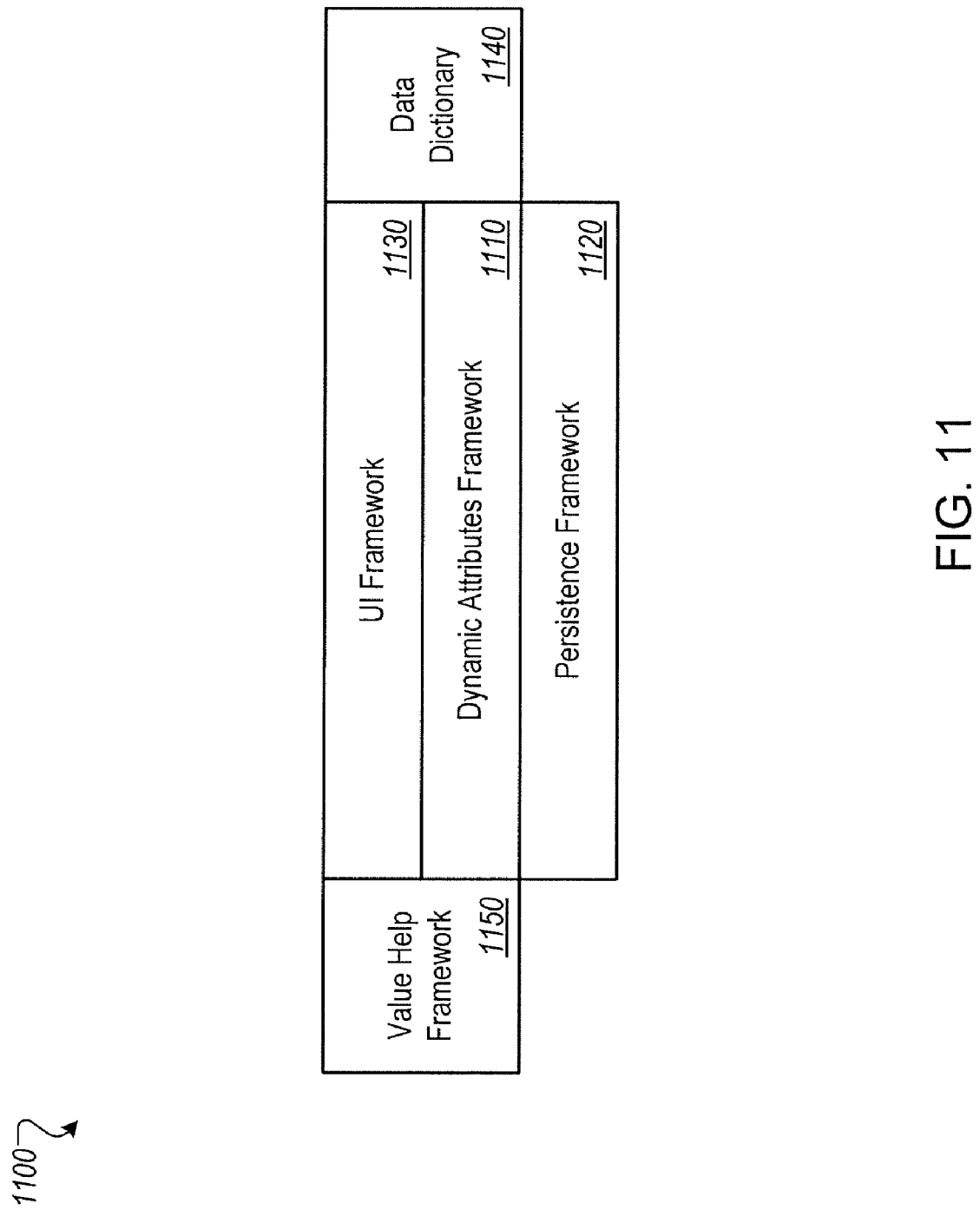
FIG. 11 is a conceptual diagram of a dynamic attributes framework integrated with other elements of a dynamic bidding tool.

Systems and techniques implementing dynamic attributes as described above may provide a number of benefits for a dynamic bidding tool. Additional benefits may be obtained by integrating a dynamic attribute framework within the dynamic bidding tool framework. FIG. 11 shows a data structure 1100 including a dynamic attributes framework 1110 (for example, a framework to associate dynamic attributes with opportunities as described above). Structure 1100 further includes a persistence framework 1120 to access transaction data in one or more databases (see, e.g., FIG. 9 above). The persistence framework provides efficiency by allowing developers to access data via an abstraction layer rather than dealing with the database complexities themselves.

Structure 1100 also includes a user interface (UI) framework 1130, which may automatically render, display, and validate input. Integrating dynamic attributes framework 1110 with UI framework 1130 allows transaction information to be displayed in a consistent way, which may increase productivity.

Structure 1100 may further include a data dictionary 1140, which may define the behavior of attributes. For example, if an opportunity includes a number representing currency (e.g., a dollar amount), the data dictionary may define how the number behaves. For example, the data dictionary may define the behavior of the number so that fifteen decimal places are retained in the database(s), but to be rounded off and displayed with only two decimal places (e.g., dollars and cents). Integrating framework 1110 with data dictionary 1140 allows for consistent attribute behavior across different aspects of the dynamic bidding tool.

Structure 1100 may further include a value help structure 1150. Value help structure may allow a complex object in the system to become a dynamic attribute. For example, various currencies may be defined in the value help framework. The currency definitions may then be added to an opportunity as a dynamic attribute.

A dynamic bidding tool that allows the generation of administrator dynamic attributes may offer a number of challenges. For example, if a system administrator creates a administrator dynamic attribute that will affect subsequently generated response templates, the response template may be different than that foreseen by the user creating the opportunity. This may be particularly problematic when the user associates particular dynamic attributes with the opportunity; for example, when the user generated dynamic attribute is the same as or in conflict with the administrator dynamic attribute.

Figure 12:
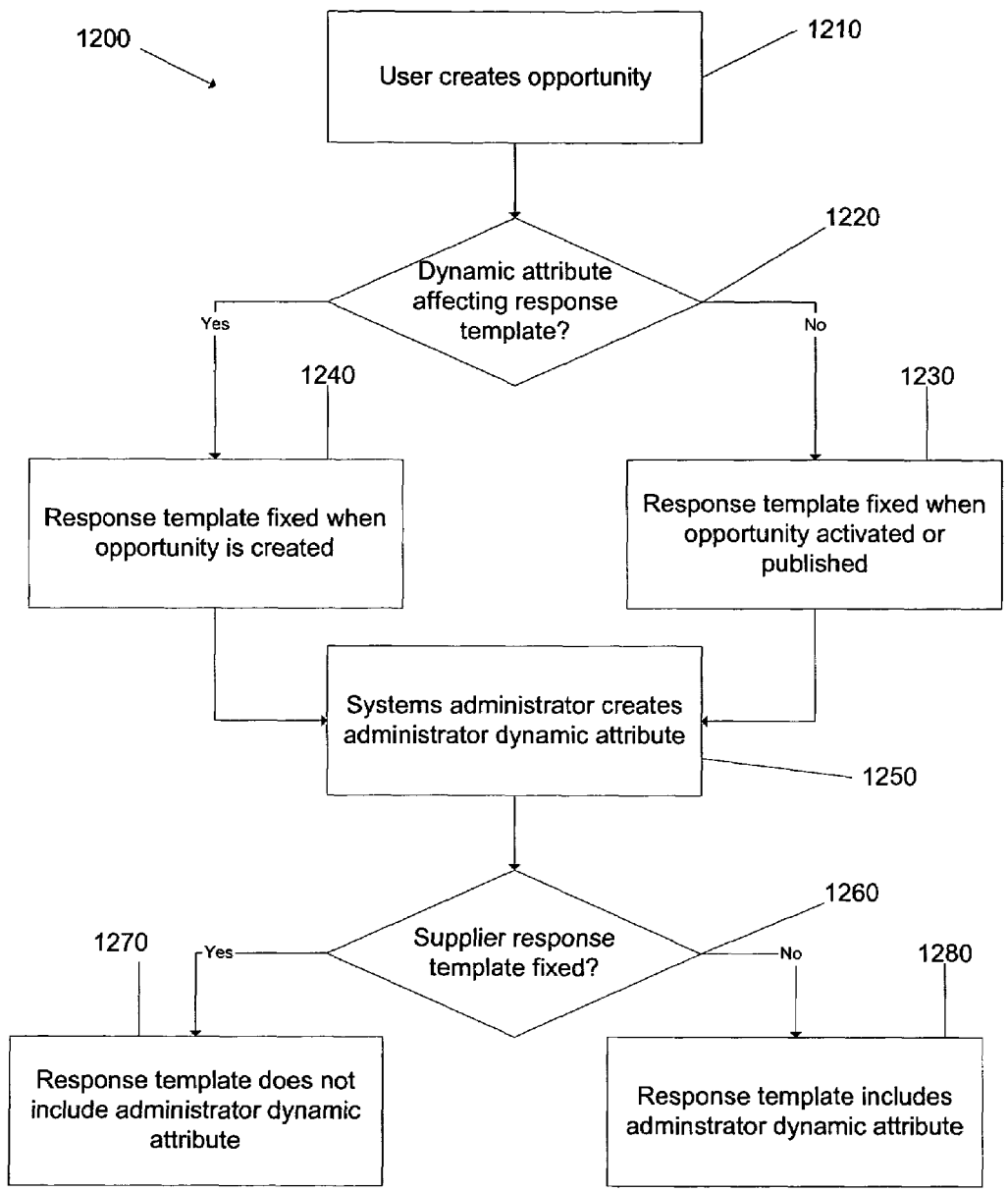
FIG. 12 shows a method to fix a response template when one or more administrator dynamic attributes are created.

FIG. 12 shows a method that may be used to provide predictability in response template generation. A user may create an opportunity (1210). The system may act differently depending on whether the user associates a dynamic attribute affecting the response template with the opportunity (1220). If the user does not associate a dynamic attribute affecting the response template with the opportunity, the supplier response template is fixed when the opportunity is activated or published to potential suppliers (1230). If the user associates a dynamic attribute with the opportunity that affects the supplier response template (i.e., the dynamic attribute is to solicit additional information from the supplier), the supplier response template is fixed when the user saves the opportunity (1240). That is, when a supplier chooses to respond to the opportunity, the response template includes the static attribute, administrator dynamic attributes generated before the user saved the opportunity, and dynamic attributes generated by the user in creating the opportunity.

After the user creates the opportunity, a systems administrator may create a administrator dynamic attribute according to a method such as that described in FIG. 10A or 10B above, where the administrator dynamic attribute affects the response template (1250). The behavior of the system may be different depending on whether the supplier response template for the opportunity created in (1210) is fixed (1260). If the administrator dynamic attribute is saved before the supplier response template is fixed, the supplier response template includes the administrator dynamic attribute (1280). If not, the supplier response template does not include the administrator dynamic attribute (1270).

A method such as that shown in FIG. 12 provides more predictability for opportunity initiators and for suppliers. The opportunity initiator no longer needs to worry that administrator dynamic attributes will duplicate or conflict with any initiator-associated dynamic attributes that affect the response template. Additionally, by fixing the response template when the opportunity is activated or published, suppliers and opportunity initiators need not worry that the system will generate different response templates for the same opportunity.

Further challenges may be presented in circumstances in which an opportunity initiator wishes to create a new opportunity by copying an existing opportunity, where there is some difference in scope between the new opportunity and the existing opportunity. For example, a user may create a first opportunity with an opportunity type of an RFQ. The user may subsequently decide to convert the RFQ to a reverse auction, so that multiple potential suppliers may bid on the line items in the opportunity. An efficient way to effect this conversion may be for the user to copy the opportunity with an opportunity type equal to an RFQ into a new opportunity with an opportunity type equal to a reverse auction. However, unless the system is configured so that dynamic attributes adapt to the scope of the opportunity being created, the copying process may be problematic.

Figure 13:
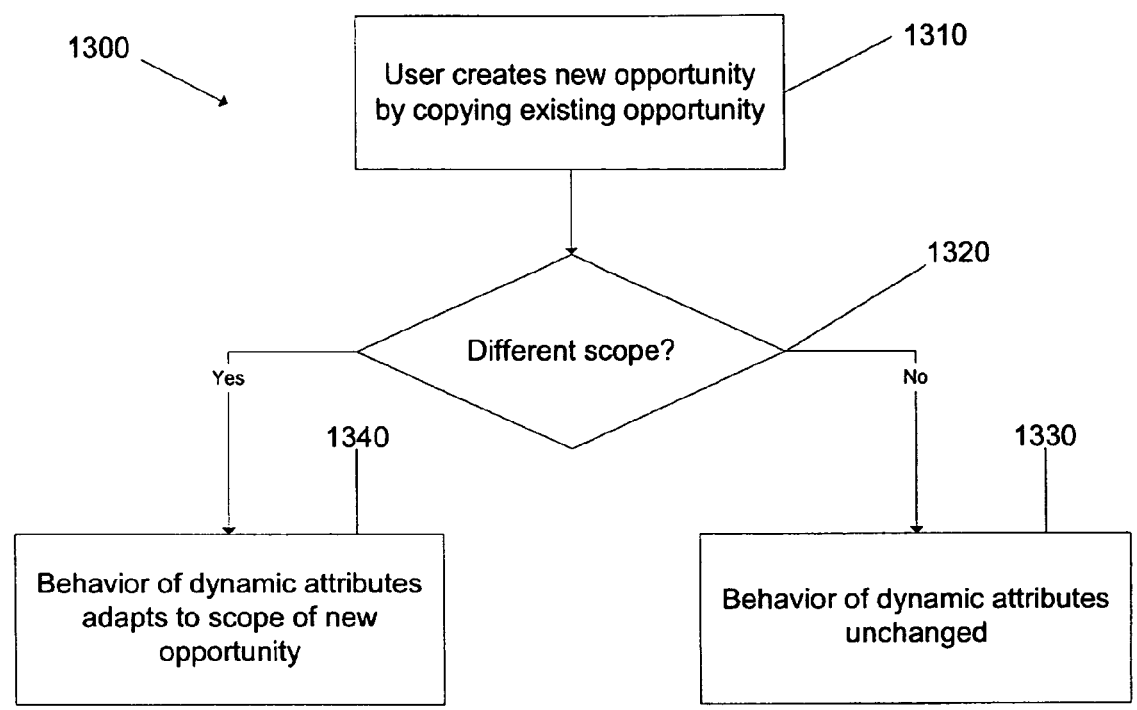
FIG. 13 shows a method for copying an opportunity including a dynamic attribute set.

FIG. 13 illustrates a method 1300 that may be used to provide dynamic attributes that adapt to the scope of the new opportunity. Here, the term scope refers to the parameters that affect the attributes associated with the particular opportunity. For example, the parameters that generally affect the attributes may include the opportunity type, the lot type (e.g., full or broken), the opportunity classification, the company identity, and the like. When one or more of the parameters is different for the new opportunity, its scope is said to differ.

A user may create a new opportunity by copying an existing opportunity (1310). The behavior of the system is different depending on the scope of the new opportunity (1320). If the scope is the same, the behavior of the dynamic attributes is unchanged (1330). Note that although the system does not alter the behavior of the dynamic attributes, the user may subsequently manipulate the dynamic attribute if desired. If the new opportunity is of a different scope, the behavior of the dynamic attributes adapts to the scope of the new opportunity (1340).

In an example, a user copies an opportunity with an opportunity type equal to an RFQ into a new opportunity with an opportunity type equal to a reverse auction. The RFQ is associated with a administrator dynamic attribute named "Binding Date," which represents the date beyond which a submitted bid is binding and may not be withdrawn. However, no such administrator dynamic attribute is generally associated with opportunities having an opportunity type equal to a reverse auction, where the lowest bid may be automatically accepted at the close of the auction (as long as the lowest bid is below an acceptance threshold). Thus, the new opportunity is not associated with the "Binding Date" dynamic attribute, and the corresponding attribute data (i.e., the binding date stored in the database table pertaining to the particular RFQ that was copied) is not copied.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Although only a few embodiments have been described in detail above, other modifications are possible. Portions of this disclosure discuss user interfaces for a dynamic bidding tool. Different user interfaces presenting different data may be used. The logic flows depicted in FIGS. 10A-10D do not require the particular order shown, or sequential order, to achieve desirable results. For example, providing dynamic attribute information may be performed at many different places within the overall process. In certain implementations, multitasking and parallel processing may be preferable.

Information may be provided to the dynamic bidding tool by typing it into an appropriate text area on a screen, by choosing an appropriate item from a list or other presentation accessible from the screen, or in another manner. For some data fields, the dynamic bidding tool may populate the field based on information provided elsewhere. Variations of the screens described herein may be used. Accordingly, other embodiments are within the scope of the following claims.

What is claimed is:

1. A computer-implemented method of conducting electronic commerce, wherein the method comprises one or more machines executing instructions stored in machine-readable storage medium to cause the machine to perform operations comprising:
   a) in a system configuration phase:
      i) receiving dynamic attribute parameters defining an administrator dynamic attribute by which to measure the desirability of a specific responder for a potential commercial transaction involving a requestor and a responder, the dynamic attribute parameters including a name and a data type for the administrator dynamic attribute; and
      ii) receiving a criterion to automatically determine whether to associate the administrator dynamic attribute with a particular opportunity object, created later, representing a particular potential commercial transaction involving a requestor and a responder, wherein, in advance of a specific responder being engaged for the specific potential commercial transaction, one or more potential responders are to provide input for the requestor to measure the desirability of the one or more potential responders for the specific potential commercial transaction; and
   b) subsequently in a system usage phase:
      i) receiving user input from a requestor to generate a new opportunity object for a particular potential commercial transaction involving the requestor and a responder to be determined after an evaluation process, the user input including opportunity attribute data for one or more attributes of the particular potential commercial transaction for which the new opportunity object is being generated;
      ii) determining whether the particular potential commercial transaction for which the new opportunity object is being generated meets the criterion based on the user input opportunity attribute data; and
      iii) automatically associating the administrator dynamic attribute with the new opportunity object if the particular potential commercial transaction for which the new opportunity object is being created meets the criterion.

2. The method of claim 1, further comprising:
   receiving one or more additional criteria; and
   automatically associating the administrator dynamic attribute with the new opportunity if the new opportunity meets one or more of the additional criteria.

3. The method of claim 1, wherein the attribute is an opportunity type, wherein the criterion is whether the opportunity type is one of one or more particular opportunity types, and wherein the determining whether the new opportunity meets the criterion based on the attribute data comprises comparing opportunity type data for the new opportunity to the one or more particular opportunity types.

4. The method of claim 1, wherein the one or more attributes include a product name and a product quantity for a line item of the opportunity.

5. The method of claim 1, further comprising generating one or more user interfaces to receive the user input to generate the new opportunity.

6. The method of claim 5, wherein the one or more user interfaces are to display attribute information pertaining to a first attribute of the one or more attributes, and further to display a first attribute field to receive user input comprising associated first attribute data.

7. The method of claim 1, further comprising:
generating a response template for an opportunity associated with the administrator dynamic attribute, the response template including one or more response user interfaces displaying attribute information pertaining to the administrator dynamic attribute and an administrator attribute field to receive user input comprising associated administrator dynamic attribute data.

8. The method of claim 7, further comprising:
receiving user input to generate a different opportunity prior to receiving the criterion to automatically determine whether to associate the administrator dynamic attribute with a particular opportunity, wherein the user input includes dynamic attribute data for a dynamic attribute to associate with the different opportunity.

9. The method of claim 8, further comprising:
transmitting opportunity data for the different opportunity to one or more potential responders; and
subsequent to receiving the criterion to automatically determine whether to associate the administrator dynamic attribute with a particular opportunity, generating a response template to receive user input from a particular potential responder of the one or more potential responders, the response template including one or more user interfaces to display attribute information pertaining to a response attribute of the one or more attributes, and further to display a response attribute field to receive user input comprising associated response attribute data.

10. The method of claim 9, wherein the attribute information includes attribute information pertaining to the dynamic attribute but not to the administrator dynamic attribute.

11. The method of claim 1, further comprising receiving user input to generate a copied opportunity based on the new opportunity.

12. The method of claim 11, wherein the new opportunity is associated with a dynamic attribute set consisting of one or more dynamic attributes.

13. The method of claim 12, further comprising:
receiving user input including a opportunity type data for an opportunity type attribute of the copied opportunity;
determining if the opportunity type data for the copied opportunity is the same as opportunity type data for the new opportunity; and
if the opportunity type data for the copied opportunity is the same as opportunity type data for the new opportunity, associating the dynamic attribute set with the copied opportunity.

14. The method of claim 13, further comprising:
if the opportunity type data for the copied opportunity is different than the opportunity type data for the new opportunity, associating a different set of dynamic attributes with the copied opportunity.

15. The method of claim 12, further comprising:
receiving user input including attribute data for an attribute of the copied opportunity; determining if the attribute data for the copied opportunity is the same as corresponding attribute data for the new opportunity; and
if the attribute data for the copied opportunity is the same as the corresponding attribute data for the new opportunity, associating the dynamic attribute set with the copied opportunity.

16. The method of claim 15, further comprising:
if the attribute data for the copied opportunity is different than the corresponding attribute data for the new opportunity, associating a different set of dynamic attributes with the copied opportunity.

17. An article comprising a machine-readable medium storing instructions operable to cause one or more machines to perform operations comprising:
a) in a system configuration phase:
i) receiving dynamic attribute parameters defining an administrator dynamic attribute by which to measure the desirability of a specific responder for a potential commercial transaction involving a requestor and a responder, the dynamic attribute parameters including a name and a data type for the administrator dynamic attribute; and
ii) receiving a criterion to automatically determine whether to associate the administrator dynamic attribute with a particular opportunity object, created later, representing a particular potential commercial transaction involving a requestor and a responder, wherein, in advance of a specific responder being engaged for the specific potential commercial transaction, one or more potential responders are to provide input for the requestor to measure the desirability of the one or more potential responders for the specific potential commercial transaction; and
b) subsequently in a system usage phase:
i) receiving user input from a requestor to generate a new opportunity object for a particular potential commercial transaction involving the requestor and a responder to be determined after an evaluation process, the user input including opportunity attribute data for one or more attributes of the particular potential commercial transaction for which the new opportunity object is being generated;
ii) determining whether the particular potential commercial transaction for which the new opportunity object is being generated meets the criterion based on the user input opportunity attribute data; and
iii) automatically associating the administrator dynamic attribute with the new opportunity object if the particular potential commercial transaction for which the new opportunity object is being created meets the criterion.

18. The article of claim 17, further comprising:
receiving one or more additional criteria; and
automatically associating the administrator dynamic attribute with the new opportunity if the new opportunity meets one or more of the additional criteria.

19. The article of claim 17, wherein the attribute is an opportunity type, wherein the criterion is whether the opportunity type is one of one or more particular opportunity types, and wherein the determining whether the new opportunity meets the criterion based on the attribute data comprises comparing opportunity type data for the new opportunity to the one or more particular opportunity types.

20. The article of claim 17, wherein the one or more attributes include a product name and a product quantity for a line item of the opportunity.

21. The article of claim 17, further comprising generating one or more user interfaces to receive the user input to generate the new opportunity.

22. The article of claim 21, wherein the one or more user interfaces are to display attribute information pertaining to a first attribute of the one or more attributes, and further to display a first attribute field to receive user input comprising associated first attribute data.

23. The article of claim 17, further comprising:
generating a response template for an opportunity associated with the administrator dynamic attribute, the response template including one or more response user interfaces displaying attribute information pertaining to the administrator dynamic attribute and an administrator attribute field to receive user input comprising associated administrator dynamic attribute data.

24. The article of claim 23, further comprising:
receiving user input to generate a different opportunity prior to receiving the criterion to automatically determine whether to associate the administrator dynamic attribute with a particular opportunity, wherein the user input includes dynamic attribute data for a dynamic attribute to associate with the different opportunity.

25. The article of claim 24, further comprising:
transmitting opportunity data for the different opportunity to one or more potential responders; and
subsequent to receiving the criterion to automatically determine whether to associate the administrator dynamic attribute with a particular opportunity, generating a response template to receive user input from a particular potential responder of the one or more potential responders, the response template including one or more user interfaces to display attribute information pertaining to a response attribute of the one or more attributes, and further to display a response attribute field to receive user input comprising associated response attribute data.

26. The article of claim 25, wherein the attribute information includes attribute information pertaining to the dynamic attribute but not to the administrator dynamic attribute.

27. The article of claim 17, further comprising receiving user input to generate a copied opportunity based on the new opportunity.

28. The article of claim 27, wherein the new opportunity is associated with a dynamic attribute set consisting of one or more dynamic attributes.

29. The article of claim 28, further comprising:
receiving user input including a opportunity type data for an opportunity type attribute of the copied opportunity;
determining if the opportunity type data for the copied opportunity is the same as opportunity type data for the new opportunity; and
if the opportunity type data for the copied opportunity is the same as opportunity type data for the new opportunity, associating the dynamic attribute set with the copied opportunity.

30. The article of claim 29, further comprising:
if the opportunity type data for the copied opportunity is different than the opportunity type data for the new opportunity, associating a different set of dynamic attributes with the copied opportunity.

31. The article of claim 28, further comprising:
receiving user input including attribute data for an attribute of the copied opportunity;
determining if the attribute data for the copied opportunity is the same as corresponding attribute data for the new opportunity; and
if the attribute data for the copied opportunity is the same as the corresponding attribute data for the new opportunity, associating the dynamic attribute set with the copied opportunity.

32. The article of claim 31, further comprising:
if the attribute data for the copied opportunity is different than the corresponding attribute data for the new opportunity, associating a different set of dynamic attributes with the copied opportunity.

33. A system, comprising:
a) in a system configuration phase:
  i) means for receiving dynamic attribute parameters defining an administrator dynamic attribute by which to measure the desirability of a specific responder for a potential commercial transaction involving a requestor and a responder, the dynamic attribute parameters including a name and a data type for the administrator dynamic attribute; and
  ii) means for receiving a criterion to automatically determine whether to associate the administrator dynamic attribute with a particular opportunity object, created later, representing a particular potential commercial transaction involving a requestor and a responder, wherein, in advance of a specific responder being engaged for the specific potential commercial transaction, one or more potential responders are to provide input for the requestor to measure the desirability of the one or more potential responders for the specific potential commercial transaction; and
b) subsequently in a system usage phase:
  i) means for receiving user input from a requestor to generate a new opportunity object for a particular potential commercial transaction involving the requestor and a responder to be determined after an evaluation process, the user input including opportunity attribute data for one or more attributes of the particular potential commercial transaction for which the new opportunity object is being generated;
  ii) means for determining whether the particular potential commercial transaction for which the new opportunity object is being generated meets the criterion based on the user input opportunity attribute data; and
  iii) means for automatically associating the administrator dynamic attribute with the new opportunity object if the particular potential commercial transaction for which the new opportunity object is being created meets the criterion.

34. The system of claim 33, further comprising:
means for receiving one or more additional criteria; and
means for automatically associating the administrator dynamic attribute with the new opportunity if the new opportunity meets one or more of the additional criteria.

35. The system of claim 33, wherein the attribute is an opportunity type, wherein the criterion is whether the opportunity type is one of one or more particular opportunity types, and wherein the determining whether the new opportunity meets the criterion based on the attribute data comprises comparing opportunity type data for the new opportunity to the one or more particular opportunity types.

36. The system of claim 33, wherein the one or more attributes include a product name and a product quantity for a line item of the opportunity.

37. The system of claim 33, further comprising means for generating one or more user interfaces to receive the user input to generate the new opportunity.

38. The system of claim 37, wherein the one or more user interfaces are to display attribute information pertaining to a first attribute of the one or more attributes, and further to display a first attribute field to receive user input comprising associated first attribute data.

39. The system of claim 33, further comprising:
means for generating a response template for an opportunity associated with the administrator dynamic attribute, the response template including one or more response user interfaces displaying attribute information pertaining to the administrator dynamic attribute and an administrator attribute field to receive user input comprising associated administrator dynamic attribute data.

40. The system of claim 39, further comprising:
means for receiving user input to generate a different opportunity prior to receiving the criterion to automatically determine whether to associate the administrator dynamic attribute with a particular opportunity, wherein the user input includes dynamic attribute data for a dynamic attribute to associate with the different opportunity.

41. The system of claim 40, further comprising:
means for transmitting opportunity data for the different opportunity to one or more potential responders; and
means for generating a response template to receive user input from a particular potential responder of the one or more potential responders subsequent to receiving the criterion to automatically determine whether to associate the administrator dynamic attribute with a particular opportunity, the response template including one or more user interfaces to display attribute information pertaining to a response attribute of the one or more attributes, and further to display a response attribute field to receive user input comprising associated response attribute data.

42. The system of claim 41, wherein the attribute information includes attribute information pertaining to the dynamic attribute but not to the administrator dynamic attribute.

43. The system of claim 33, further comprising means for receiving user input to generate a copied opportunity based on the new opportunity.

44. The system of claim 43, wherein the new opportunity is associated with a dynamic attribute set consisting of one or more dynamic attributes.

45. The system of claim 44, further comprising:
means for receiving user input including a opportunity type data for an opportunity type attribute of the copied opportunity;
means for determining if the opportunity type data for the copied opportunity is the same as opportunity type data for the new opportunity; and
means for associating the dynamic attribute set with the copied opportunity if the opportunity type data for the copied opportunity is the same as opportunity type data for the new opportunity.

46. The system of claim 45, further comprising:
means for associating a different set of dynamic attributes with the copied opportunity if the opportunity type data for the copied opportunity is different than the opportunity type data for the new opportunity.

47. The system of claim 44, further comprising:
means for receiving user input including attribute data for an attribute of the copied opportunity;
means for determining if the attribute data for the copied opportunity is the same as corresponding attribute data for the new opportunity; and
means for associating the dynamic attribute set with the copied opportunity if the attribute data for the copied opportunity is the same as the corresponding attribute data for the new opportunity.

48. The system of claim 47, further comprising:
means for associating a different set of dynamic attributes with the copied opportunity if the attribute data for the copied opportunity is different than the corresponding attribute data for the new opportunity.

\* \* \* \* \*